US012566809B2

(12) United States Patent
Harris et al.

(10) Patent No.: US 12,566,809 B2
(45) Date of Patent: Mar. 3, 2026

(54) GRAPH LEARNING AND AUTOMATED BEHAVIOR COORDINATION PLATFORM

(71) Applicant: VISA INTERNATIONAL SERVICE ASSOCIATION, San Francisco, CA (US)

(72) Inventors: Theodore Harris, Foster City, CA (US); Tatiana Korolevskaya, Foster City, CA (US); Yue Li, Foster City, CA (US); Jerry Wald, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 56 days.

(21) Appl. No.: 17/765,774

(22) PCT Filed: Oct. 1, 2019

(86) PCT No.: PCT/US2019/054096
§ 371 (c)(1),
(2) Date: Mar. 31, 2022

(87) PCT Pub. No.: WO2021/066816
PCT Pub. Date: Apr. 8, 2021

(65) Prior Publication Data
US 2022/0374484 A1      Nov. 24, 2022

(51) Int. Cl.
G06F 16/9535      (2019.01)
G06F 16/29      (2019.01)
G06Q 20/40      (2012.01)

(52) U.S. Cl.
CPC .......... G06F 16/9535 (2019.01); G06F 16/29 (2019.01); G06Q 20/40 (2013.01)

(58) Field of Classification Search
CPC ...... G06F 16/9535; G06F 16/29; G06Q 20/40
(Continued)

(56) References Cited

U.S. PATENT DOCUMENTS 9,582,547  B2      2/2017   Roberts et al.
10,872,298  B2      12/2020   Harris et al.
(Continued)

FOREIGN PATENT DOCUMENTS

CN        109416761  A      3/2019
EP          2874076  A1      5/2015
WO      2021066816  A1      4/2021

OTHER PUBLICATIONS

International Search Report and Written Opinion for corresponding PCT Application No. PCT/US2019/054096, dated Jan. 2, 2020.

*Primary Examiner* — Amy Ng
*Assistant Examiner* — Abdullah A Daud
(74) *Attorney, Agent, or Firm* — K&L Gates LLP

(57)      ABSTRACT

A system receives transaction data from payment devices of a user. The system generates a transaction profile of the user based on the received transaction data. Based on the transactional parameters, the system determines a community of the user. The system further receives one or more predefined sub-groups of the community from a database. The one or more sub-groups define subsets of activities, geographic locations, and times. The system identifies one or more rules setting limits on the transactional parameters. Absent receiving additional user interactions, the system generates a suggested community for the user as a function of the one or more rules, the activities, geographic locations, and times of the one or more sub-groups of the community. The system generates a suggested activity to the user based on the suggested community.

16 Claims, 11 Drawing Sheets

100 ⟶

(58) Field of Classification Search
USPC ........................................................ 707/722
See application file for complete search history.

(56) References Cited

U.S. PATENT DOCUMENTS

| | | | |
|---|---|---|---|
| 11,449,854 B1* | 9/2022 | Henderson | G06Q 20/327 |
| 2009/0157613 A1* | 6/2009 | Strohmenger | G06Q 10/10 |
| 2015/0142785 A1* | 5/2015 | Roberts | G06F 16/35 |
| | | | 707/723 |
| 2015/0249704 A1* | 9/2015 | Shah | H04L 41/22 |
| | | | 715/734 |
| 2015/0347556 A1* | 12/2015 | Sanio | H04W 4/21 |
| | | | 709/206 |
| 2017/0123600 A1 | 5/2017 | Jones-McFadden et al. | |
| 2018/0053085 A1* | 2/2018 | Matsumoto | G06N 3/04 |
| 2018/0165654 A1* | 6/2018 | Berger | G06Q 30/0201 |
| 2018/0203845 A1* | 7/2018 | Torii | G16H 10/60 |
| 2018/0211661 A1* | 7/2018 | Kudo | G10L 15/22 |
| 2020/0106843 A1* | 4/2020 | Agnihotram | H04L 67/12 |
| 2020/0396193 A1* | 12/2020 | Mayers | G06F 3/04883 |

* cited by examiner

FIG. 2A     200
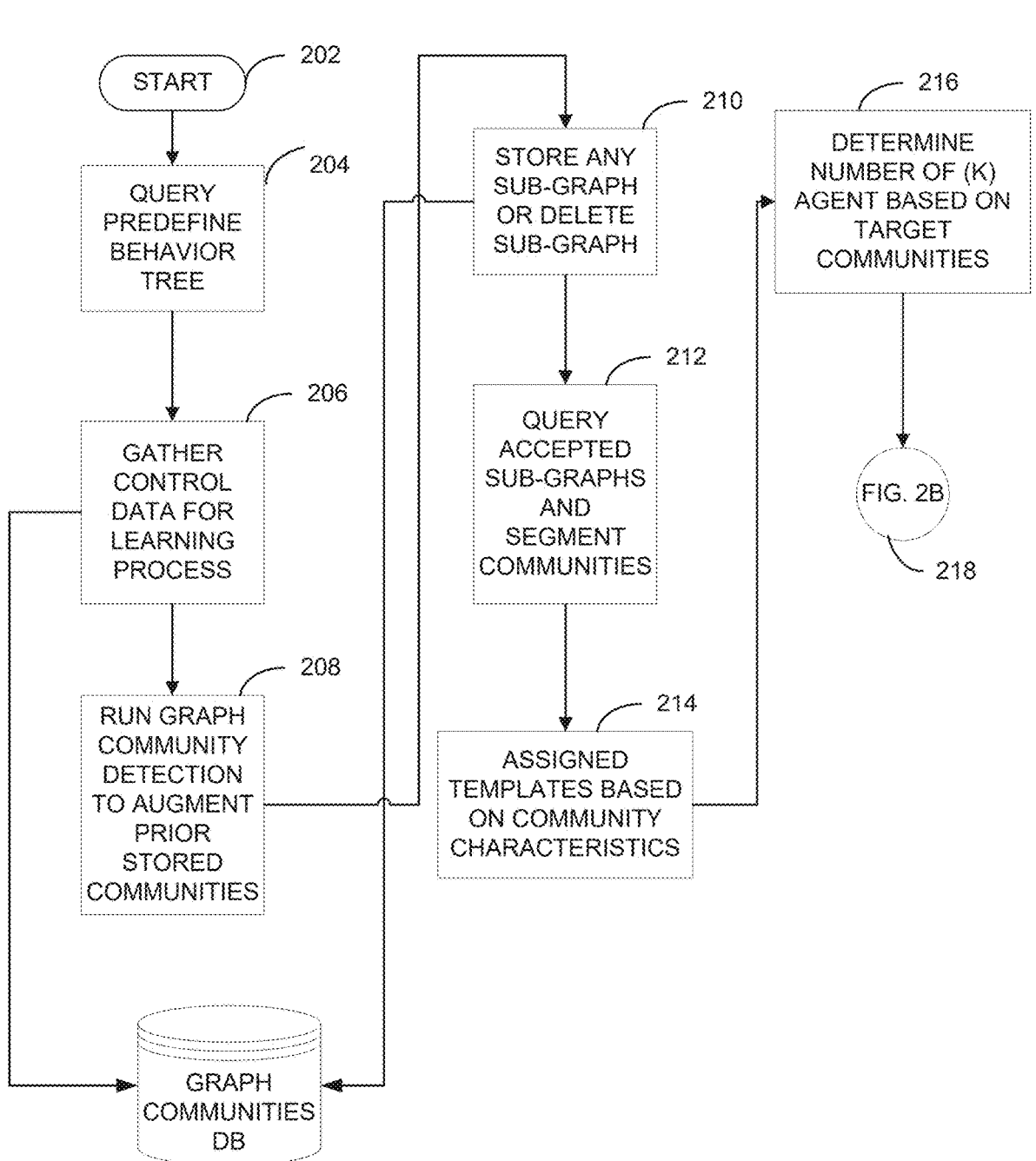

FIG. 5

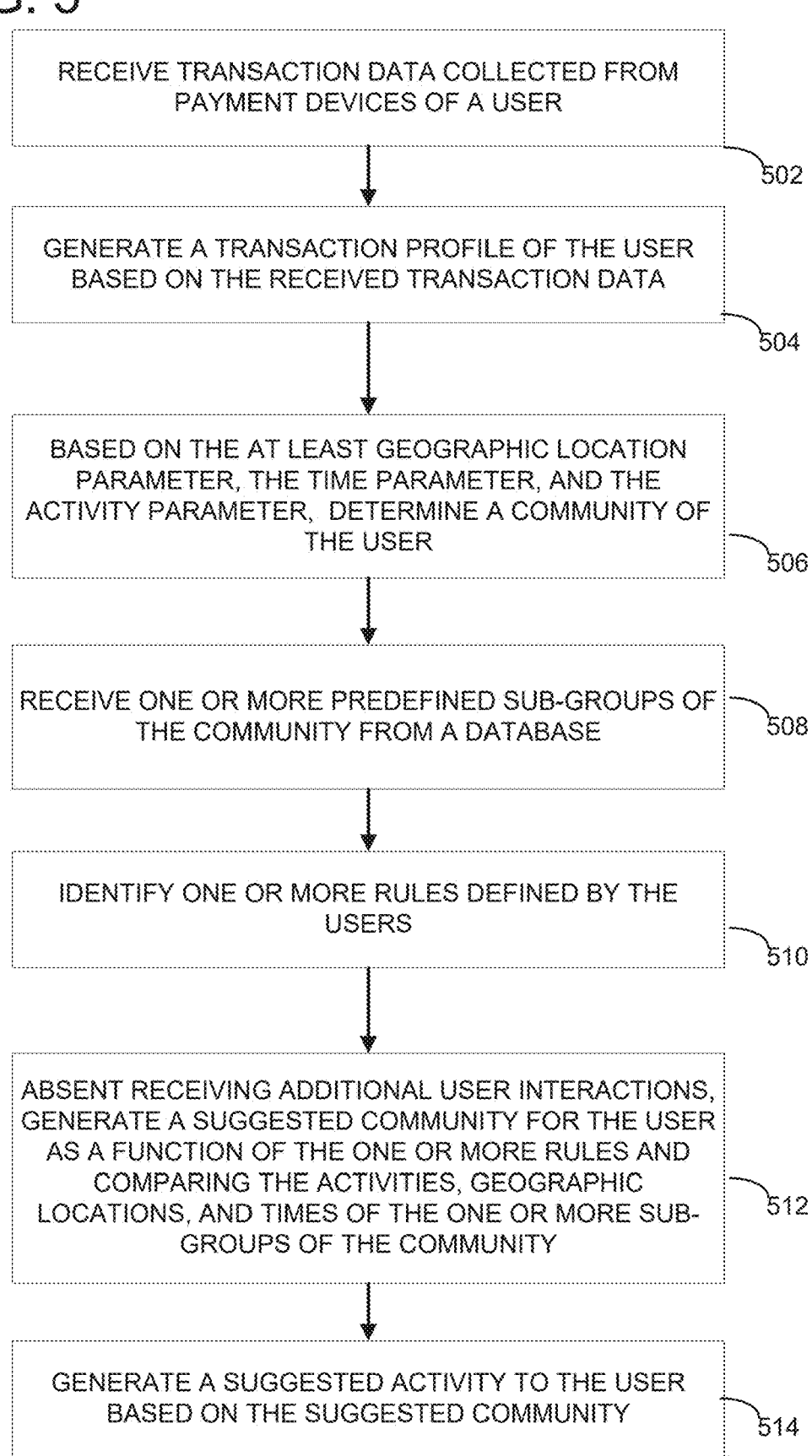

RECEIVE TRANSACTION DATA COLLECTED FROM PAYMENT DEVICES OF A USER

502

GENERATE A TRANSACTION PROFILE OF THE USER BASED ON THE RECEIVED TRANSACTION DATA

504

BASED ON THE AT LEAST GEOGRAPHIC LOCATION PARAMETER, THE TIME PARAMETER, AND THE ACTIVITY PARAMETER, DETERMINE A COMMUNITY OF THE USER

506

RECEIVE ONE OR MORE PREDEFINED SUB-GROUPS OF THE COMMUNITY FROM A DATABASE

508

IDENTIFY ONE OR MORE RULES DEFINED BY THE USERS

510

ABSENT RECEIVING ADDITIONAL USER INTERACTIONS, GENERATE A SUGGESTED COMMUNITY FOR THE USER AS A FUNCTION OF THE ONE OR MORE RULES AND COMPARING THE ACTIVITIES, GEOGRAPHIC LOCATIONS, AND TIMES OF THE ONE OR MORE SUB-GROUPS OF THE COMMUNITY

512

GENERATE A SUGGESTED ACTIVITY TO THE USER BASED ON THE SUGGESTED COMMUNITY

514

GRAPH LEARNING AND AUTOMATED BEHAVIOR COORDINATION PLATFORM

CROSS-REFERENCE TO RELATED APPLICATION

This application is a National Phase application of International Patent Application No. PCT/US2019/054096, filed on Oct. 1, 2019, the entire contents of which are expressly incorporated by reference herein.

TECHNICAL FIELD

Embodiments discussed herein generally relate to an intelligent activity recommendation or anticipation system.

BACKGROUND

As people's lives become more complex and interact with others in more diverse circumstances, the ability to coordinate behavior, (such as carpooling or group discounts) becomes increasing difficult. In addition, technologies have facilitated various dimensions of a sharing economy to flourish and provide convenience to members of a community that has not had the opportunity to enjoy in the past. Social groups such as carpool, group discounts for merchandizes, etc., have become popular. However, these implementations, over time, have become insufficient to the added complexity brought by the advanced technologies.

For example, just because a parent is part of a social group of parents and that at a given moment in time that another parent is available to drive does not mean that the carpool is feasible for the parent—because the other parent's location is 20 miles away. As such, the fact that individuals are in a certain community or group by interests or other common factor fails to facilitate participation of similar activities.

However, the fact of not being able to coordinate that vehicle, as a resource, for others to consume presents a tremendous waste of resources (i.e. idle cars) and time (e.g., other families dropping off kids when they could carpool in a different group or in a nearby location). While the sharing economy has addressed some of this wastage, given the complexity and diversity of the problems, much waste is still occurring.

What is needed is a learning platform that may coordinate user activity across target population utilizing a variety of different data inputs. Therefore, embodiments attempt to create a technical solution to address the deficiencies of the challenges above.

SUMMARY

Embodiments create a technical solution to the above challenges by modifying or updating the existing approaches first using a graph structure to represent user's behaviors and desired activities. Based on this graph structure, an automated and coordinated system of aspects of embodiments create proposed coordinated or suggested sub-graph structures or branches by a graph learner using a edit distance similarity measure that calculates the minimum cost of transformation of one parties graph from proposed subgraph. In another embodiment, the system may submit proposed sub-graphs (which embody the coordination plan) to target "blocks or sections" of the graph structure. Members within the proposed new blocks or sections may choose to adopt these proposals for future coordination.

In one embodiment, if a sufficient number of blocks member choose to adopt the proposed, aspects of embodiments set up alerts and a coordination plans for the blocks in the graph. In a further aspect, embodiments learn over time via feedback from users and adoption rates of proposed sub-graph structures.

Moreover, aspects of embodiments may operate in autonomous mode. For example, for lending usage of cars or parking spaces, aspects of embodiments may include engines that may cycle through available autonomous assets and match their use case against target end users. An example asset may be a parking space and target end users may be drivers in the vicinity of the parking space.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIGS. 2A, 2B, and 2C are diagrams illustrating a process flow according to one embodiment.

FIG. 5 is a flow chart illustrating a method according to one embodiment.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments create a new graph extension structure to represent a suggested community to a user based on the user's activities. In one aspect, embodiments create a graph structure representing a user's activities. Based the graph structure, aspects of embodiments further create a community based on the edges and vertices of the graph structure. Once the activities and communities are represented, artificial intelligence (AI) or deep learning algorithms may construct sub-graphs for the user as his or her activities change or evolve. As such, embodiments may suggest new communities to the user to expand on his or her existing ones.

Figure 1:
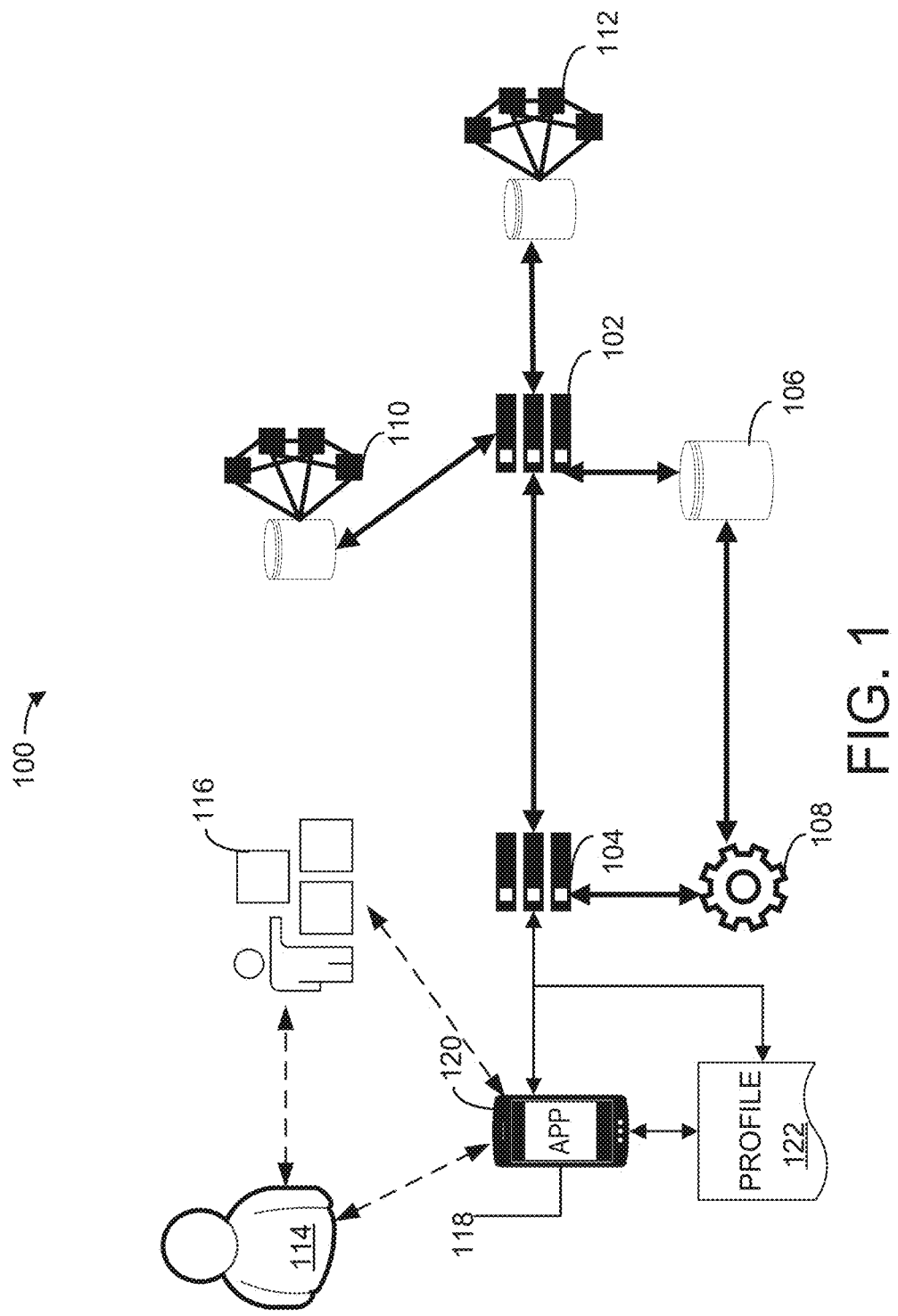
FIG. 1 is a diagram illustrating a system according to one embodiment.
Figure 2B:
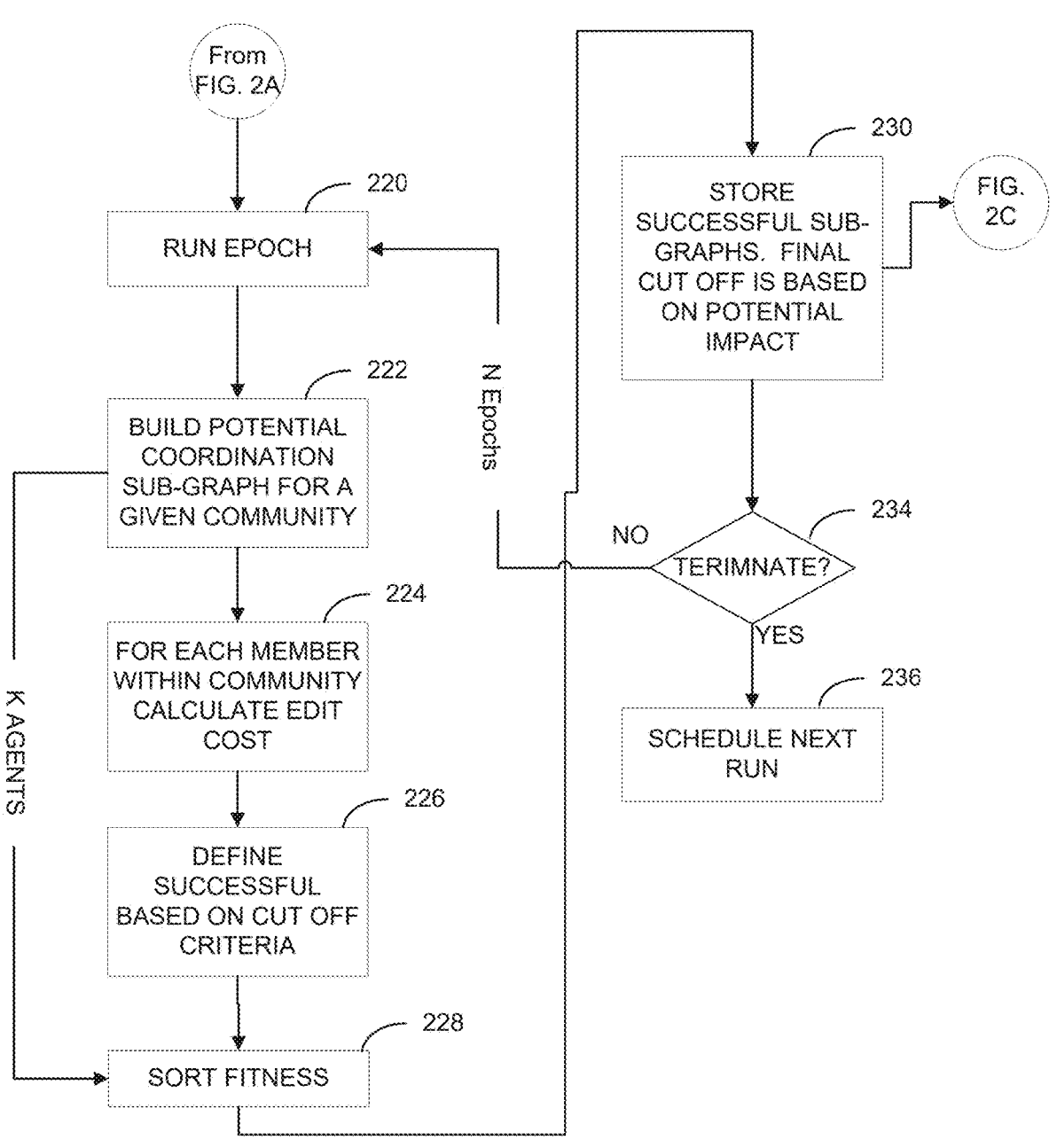
Figure 2C:
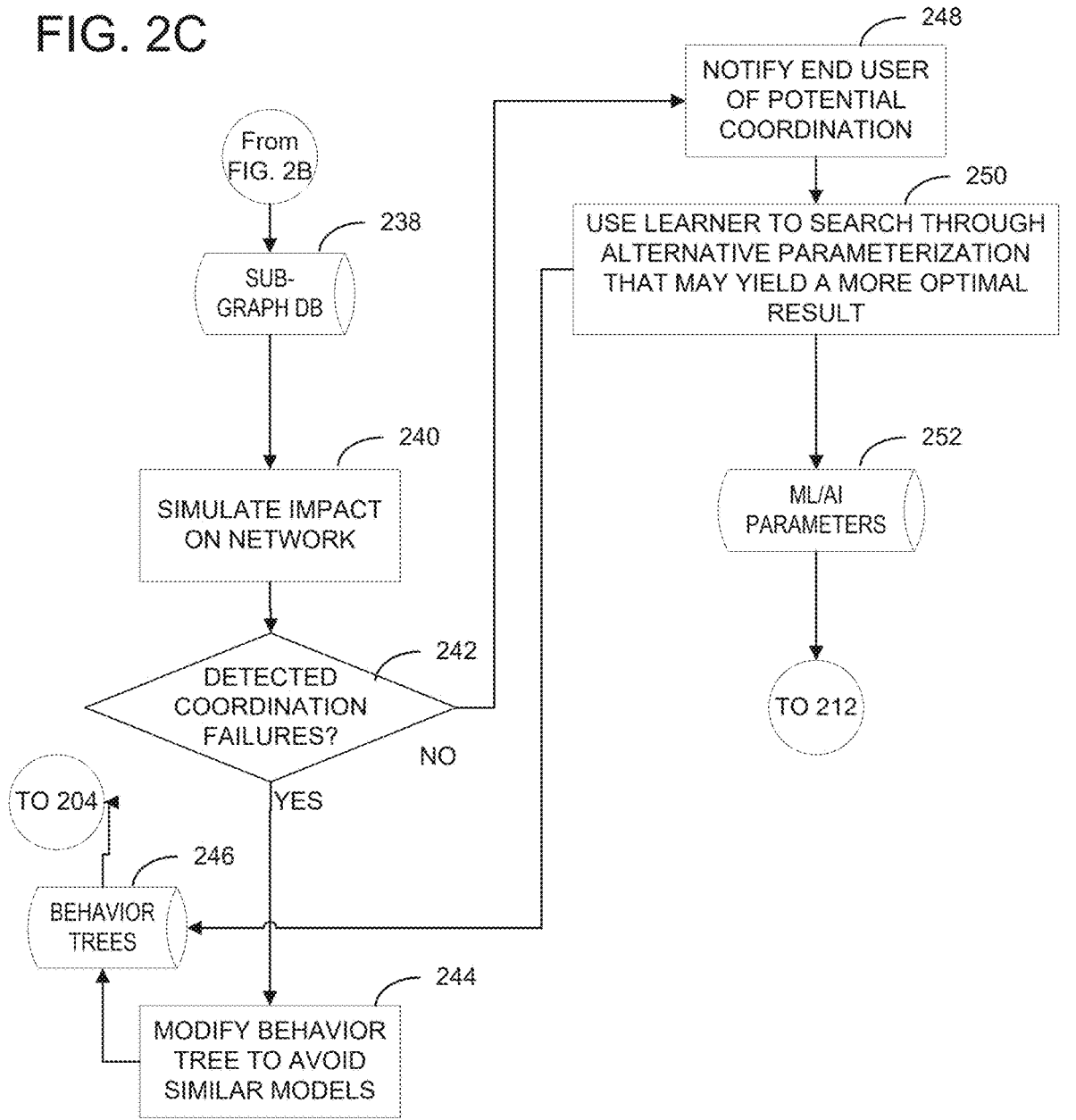

Referring now to FIG. 1, a system 100 may illustrate a high level system implementation according to one embodiment. The system 100 may include a server 102 that process transactions in a payment processing network. In one embodiment, the server 102 may be a cluster of servers that spread across geographic regions as transactions are submitted around the world. Transactions may include transaction data coming from an acquirer 110 (e.g., when a consumer makes a purchase at a merchant) and, after processing and verification, to and return from an issuer 112 of the consumer's payment device. As such, the server 102 may handle encryption, decryption, and authentication, etc., (e.g., via a token or a hash) of the transaction data to complete a given transaction. In another embodiment, the server 102 may include or may be coupled to a front end server 104 and a data store 106 for storing transaction data. For example, the front end server 104 may provide graphical user interface (GUI) to portals to service consumers and merchants. In another embodiment, the front server 104 may provide web services to service client applications or apps. In one embodiment, the front end server 104 and the server 102 may host a digital wallet service that enable a consumer to manage and pay for goods and services using the user's payment devices, such as a credit card or a debit card.

In another embodiment, the system 100 may include a configuration portal 108 for administrator privileged users to configure, management, and administer the server 102, the front end server 104, and the data store 106. In a further embodiment, the data store 106 may store temporary transaction data or historical data for analysis. In this aspect, the historical data may be a copy of the actual transaction data and the copy has been anonymized such that personal identifying data has been removed, unless explicit and specific authorization has been given by the user.

In a further embodiment, a user 114 may initiate a transaction (e.g., payment for goods or services) at a merchant 116 or may initiate a transaction via a mobile device 118 of the user 114. The mobile device 118, having an app or a browser 120 (hereinafter "app" for simplicity and not as a limitation), may navigate the user 114 to a portal hosted or sponsored by the merchant 116 so that the user 114 may complete the transaction.

As the user 114 may use or interact with the mobile device 118 or the app 120 to conduct transactions, whether it is initiating or preparing (e.g., browsing through a catalog of goods or services), the user 114 may leave actions or steps in the mobile device 118. Aspects of embodiment enable the mobile device 118 and/or the app 120 to save the behaviors of the user 114 (with user's permission) on the mobile device 118. In another embodiment, the behavior data may be transmitted to the server 102 for analysis and to provide a better experience to the user 114, to be discussed further below.

Figure 6:
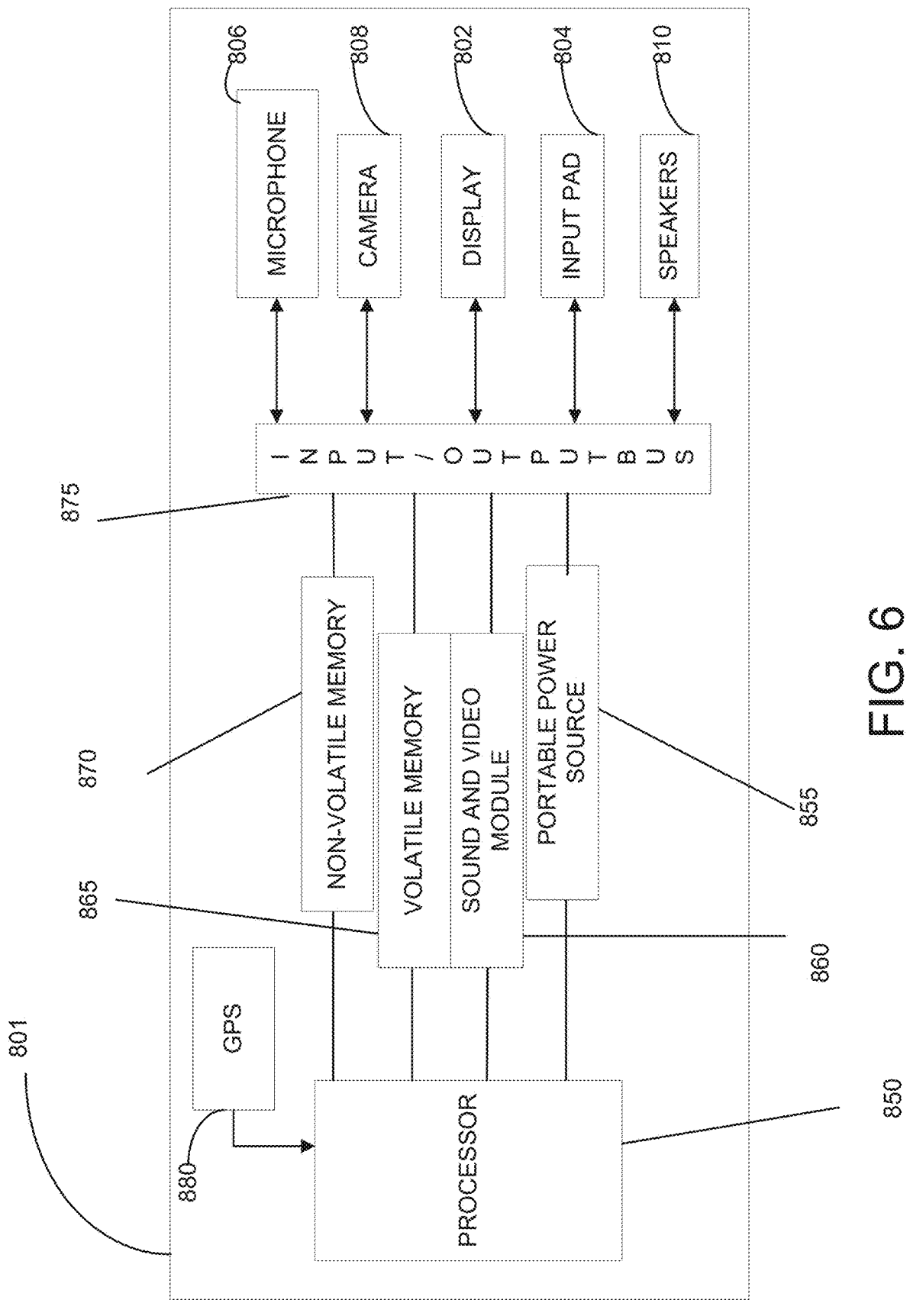
FIG. 6 is a diagram illustrating a portable computing device according to one embodiment.

In addition to transactional data, the user 114 may use the mobile device 118 as a personal assistance that manages and organizes the user's lives. For example, the mobile device 118 may be a smartphone that may include components of a portable device as shown in FIG. 6. The smartphone may enable the user 114 to receive messages (e.g., notifications, text messages, email messages, or phone calls), connect to the Internet via wireless connections (e.g., BLUETOOTH, Wi-Fi, Near Field Communication (NFC), etc.) or wired connections (e.g., USB connections or lightning connections), execute or active applications that provide functions to connect the user 114 with others. In one embodiment, the user 114 may have a social network profile or account where the user 114 may use an app to interact with those in her social network group. Through the social network app, the user 114 may initiate transactions, may arrange his or her schedule activities based on information in the social network app. In a further embodiment, the user 114 may use a calendar app to schedule appointments, meetings, lunches, travels, and other activities. As such, the mobile device 118 may provide a snapshot into activities of the user 114.

In further describing aspects of embodiment, FIGS. 2A through 2D and FIGS. 3A through 3C are used to further illustrate features of the system 100. In one embodiment, FIG. 2A may illustrate a flow diagram of aspects of embodiments. For example, a process of graph learning and automated behavior coordination may begin from 202. In another embodiment, the system 100 may, in building such a graph learning platform, build activities from transactional history where each transaction is represented as a transaction profile 122 of the user 114. In one embodiment, this profile 122 may provide quantified details on a transition history. For example, the profile 122 may include an amount of transaction, a location of the transaction, a merchant ID, a location of the merchant, time of transaction, etc. Moreover, improvements of aspects of embodiments provide relational dimension to the collected data. For example, with respect to "time" of the transaction, the system 100 present and store the "time" data as both an absolute value and a relative value:

Absolute value may include the actual time with time zone information;

Relative value may include a time windows (+/−minutes, hours over a one month period); Day of Week; Month, etc. In another embodiment, the relative value of time data may further include relationship to a given event in the user's activities, such as anniversary, travel for business, vacations, etc.

In another embodiment, the location data may also be presented in an absolute value and a relative value. For example, the absolute value may include a global position system (GPS) value, a longitude and latitude coordinate, or the like. The relative value may include a relative distance between the user's location, which may be determined by the GPS location of the mobile device 118, and the location of the merchant, a projected or intended destination of the user 114 (e.g., dinner reservation, ride sharing destination, work or home address, etc.).

Figure 3A:
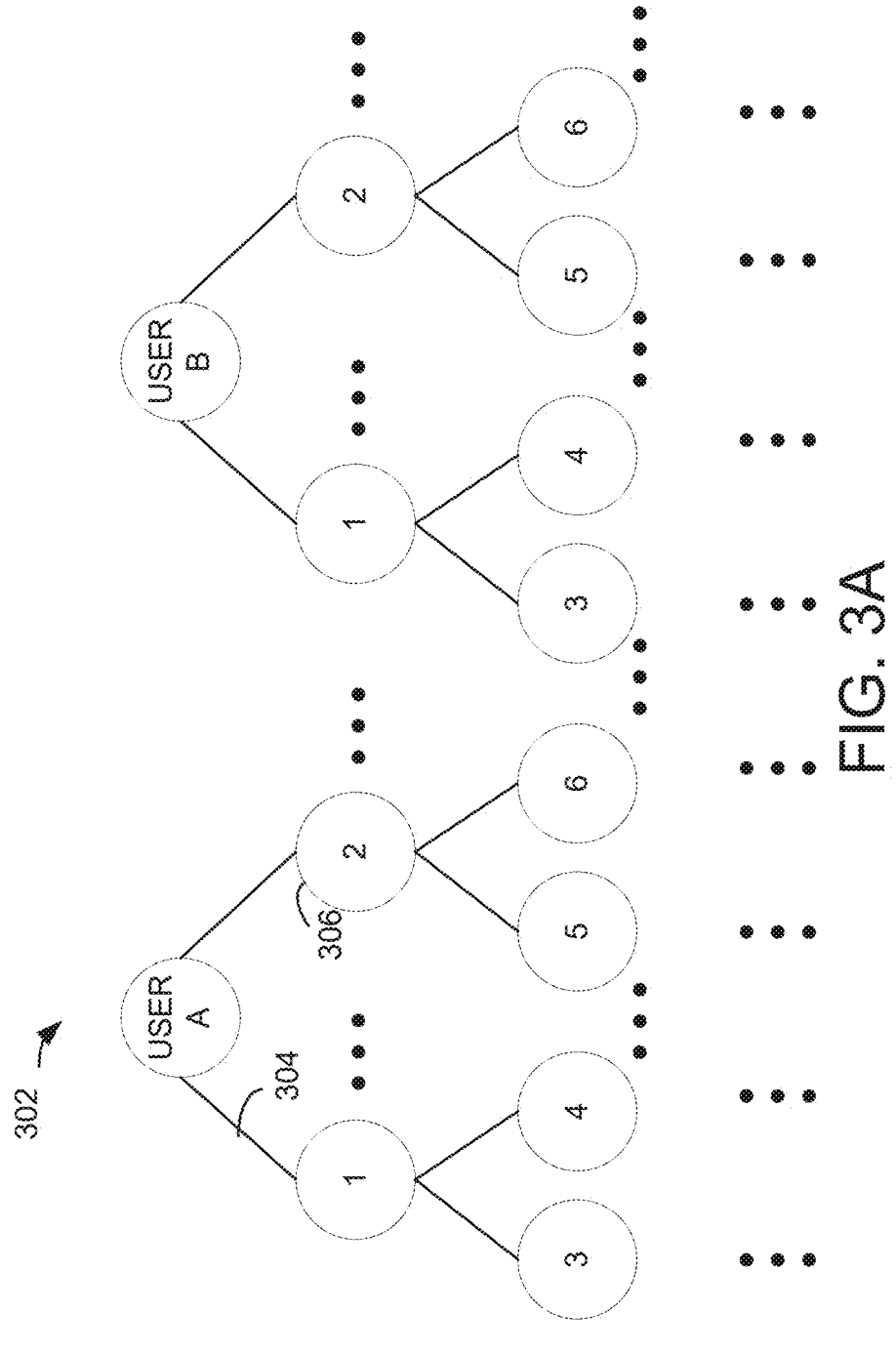
FIGS. 3A, 3B, and 3C are graph structures according to one embodiment.

With respect to activities or behavior graphs or trees, the system 100 may build a graph shown in FIG. 3A for each user. For example, a graph 302 may represent activities or behaviors of a user A, which may include at least one vertex or node 306 and an edge 304 between two vertices. In one embodiment, the vertex 306 may represent an activity and the edge 304 may represent dependency between the two vertices, and the dependency may be based on time or distance.

In one embodiment, the system 100 may query a predefined behavior or activity graph/tree of the user 114, such as the graph 302 in FIG. 3A, at 204. In one embodiment, the graph 302 may be defined by the user 114 via direct input or indication from the user 114.

In another embodiment, the graph of the user 114 may learned or discovered. For example, with permissions from the user 114, the system 100 may review and study the user's existing scope of activities, such as the user's calendar entries, social media profiles, as well as the transaction data that the system 100 has stored and received.

In addition to the graph to be constructed for the user 114, the system 100 may also build a community around the user 114. In one embodiment, the system 100 may build a community of the user 114 from transaction profile accounts that tend to shop in near proximity regularly. The user's community may not include all individuals with whom the user 114 are acquainted. For example, individuals who shop near the home location of the user 114 may be assumed to be within the same community. In another embodiment, the relative value, such as "near," may be defined as a location. In another example, people who also patronize the same restaurant or store may be flagged as being part of the same community.

In another embodiment, the user 114 may define a community. For example, the user defined community may include a collection of people with similar interests. The system 100 may use external community groups generated from social media or create community groups based on transaction. For example, friends and friend of friends from social media; interest groups (for example school parent's list); and email contact list may be some of the sources of external groups. As such, the user 114 may have multiple communities.

Once the graph has been identified or configured, the system 100 may gather or collect control data for learning process at 206. In one embodiment, the system 100 may retrieve such data from a graph communities database (DB), such as the data store 106. At 208, the system 100 may execute graph community detection to augment prior stored communities. In some embodiments, when calculating proposed graph blocks or sections of a graph, a vertex's ego net may be used. For example, an ego edit distance may be used as a way of quantifying how dissimilar two strings (e.g., words) are to one another by counting the minimum number of operations required to transform one string into the other. However as the dimension expand, communities may be more accurately reflect those vertices most similar to a target vertex. In another embodiment, the system 100 may either enable the user to define his or her communities or use machine learning to detect potential communities. The input data may be from transactional data, data generated from devices (such as a GPS tracker, or device usage (like online shopping behavior), or the like.

In a further embodiment, a graph learner algorithm, such as K-Core or the like, may create community structures to find potential target sub-populations. These communities are built using vertexes which historically indicate a sub-population is capable of coordination. For examples, geographic location, commute windows, estimate income, identified interests, and other similar attributes.

Figure 3B:
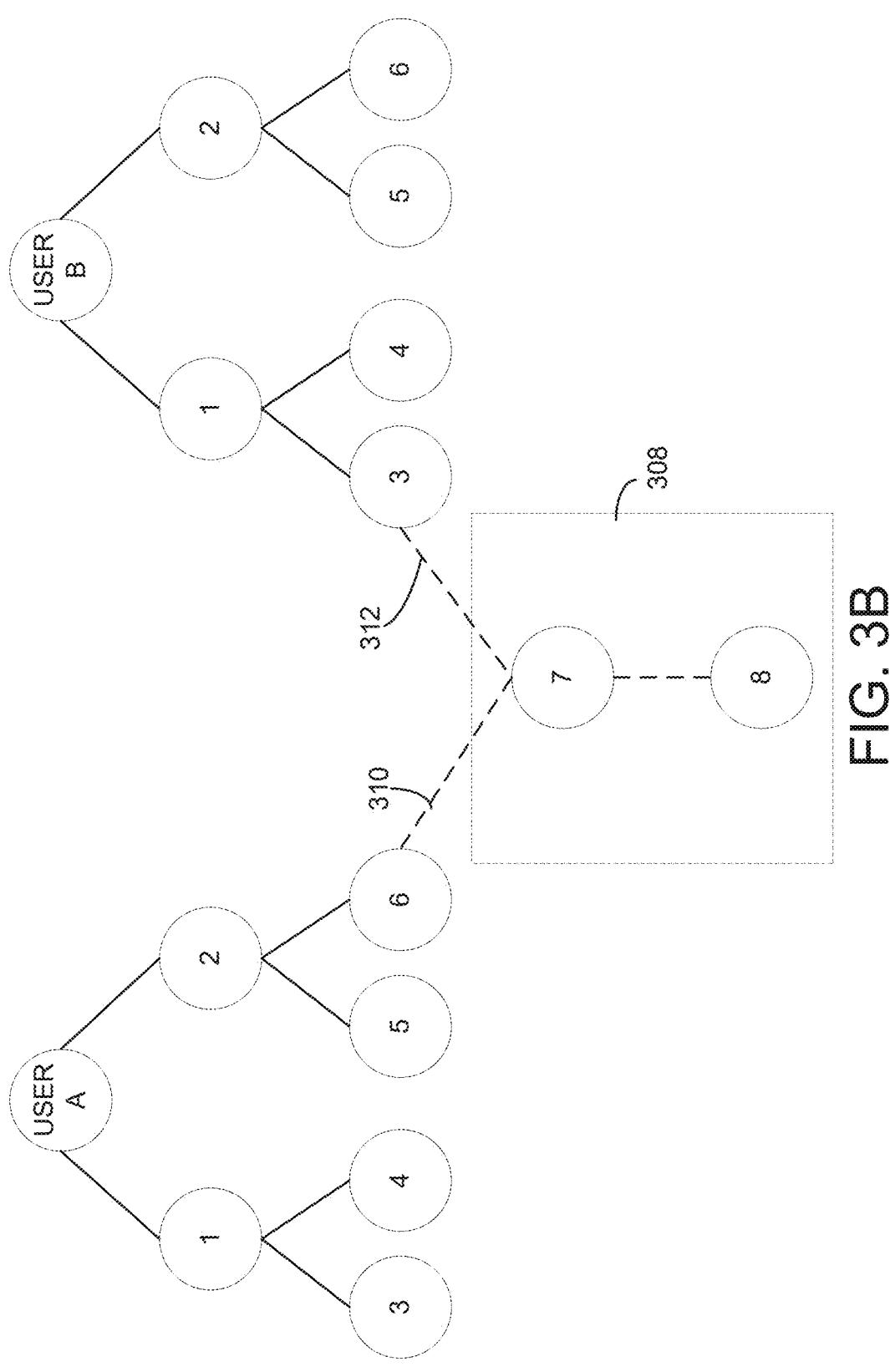

In one example, FIG. 3B illustrates a graph that may represent a community between the user A and the user B. For example, the user A may have a workout routine (activity 2) and that workout routine may include swimming (activity 5) and yoga (activity 6). Similarly, the user B may also have a workout routine (activity 1) and that routine may include rock climbing (activity 3) and running (activity 4). While they have seemingly different communities around yoga, rock climbing, swimming, and running, the system 100 may discover and suggest a new community 308 based on transactions data. For example, both user A and user B take rideshare trip to the gym where they work: yoga for user A and rock climbing for user B. In addition, the time of the transaction and the GPS location of the user A and user B place both around the same time at the same gym. With the fact that user A has a vehicle, a new community of carpool may be suggested or recommended to the user B so that a new activity 7—carpool—may be established/constructed as a sub-graph for user A and user B. Moreover, a further sub-graph may be generated or created based on subsequent activities, such as happy hour, coffee, or other activities—based on user interactions with the mobile device 118 or transaction data.

If the user 114 were to accept the sub-graph, such as sub-graph 308, the user 114 may accept the sub-graph. On the other hand, the user 114 may reject the suggested sub-graph provided by the system 100. At 210, the system 100 may store the suggested sub-graph to the user's graph structure. In one embodiment, at 212, the system may query accepted sub-graphs and segment communities based on greatest potential for sub-graph to be uncovered. In one embodiment, the query may be based on time or location-based potential. In another embodiment, at 214, the system 100 may create a template or assign an existing template based on community characteristics.

In a further embodiment, at 216, the system 100 may also determine a number of (K) agents based on target communities. Once, determined, the system 100 may transition to step 220 to run epoch, which may begin by building potential coordination sub-graph for a given community at 222. Using the example in FIG. 3B above, the coordination sub-graph may include a time dimension for the user A and user B so that the carpool may be calculated. In addition, a location dimension may also calculated into the coordination sub-graph so that user A and user B may meet at a location that is common to both. In another embodiment, the system 100 may, for each member within a community, calculate edit cost (e.g., based on the ego edit distance algorithm) for the suggested community (e.g., such as edge 310 and 312) at 224.

In one embodiment, the following may illustrate a multi-factor weighted ego edit distance algorithm for the system 100:

Multi-Factor Weighted Ego Edit Distance
Input: egonet(j) and egonet(k) #EgoNet fo vertex v and u
Edge weights include
1) Estimated Resources Cost
   a) Physical (store)
      time and distance between physical locations
   b) Virtual (Web sight)
      Average time on site
2) Preference Factors
   a) Language
3) Similarity measures for store
   a) Yoga vs Judo as measured by peer metrics such as % switch between two
InSc=egonet(j) WeightedIntersection egonet(k)
Union=egonet(j) WeightedUnion egonet(k)
Dist=|Union|−|InSc|
Cj=count(egonet(j))

Ck=count(egonet(k))

NormDist=Dist/(Cj+Ck)

Ouput NormDist

In one embodiment, the system 100 may also define successful sub-graph based on cut off criteria at 226. For example, the cut off criteria may include a measure of cost (e.g., for user B, less than $5 per ride), a measure of time (e.g., for user A, wait time less than 3 minutes), a measure of distance (e.g., for users A and B, pickup location less than 0.5 miles from each other), and other criteria.

At 228, the system 100 may sort the data to fit the sub-graph before storing the successful sub-graphs at 230. In one embodiment, the system 100 may deploy K agents in building the potential coordination sub graph while sorting the fitness of the graph.

In one embodiment, the system 100 may store the successful sub-graphs to a sub-graph DB 238. In another embodiment, the system 100 may determine whether to finally cut off the sub-graphs based on potential impact to the user A, user B, or the suggested community. As such, the system 100 may perform a determination at 234: if not, the system 100 may resume running N times of epoch of identifying the sub-graphs. If the determination is yes, then the system 100 may terminate the existing run and schedule a next run at 236.

In one embodiment, a user's profiles and activity log may be used to generate vertexes and edges to create a hyper graph. As discussed, a graph leaner may generate proposed communal behavior graph based on minimum weighted edit distance similarity measure. In one example, such an algorithm may run on a sub-population of the graph based on predefined communities (either generated or user defined). Next a modified Block Assignment Graph Algorithm (BAGA) may be employed to create proposed coordination plans. The BAGA is modified version to use a weighted minimum cost of transformation measure when comparing a target person ego-net to a proposed community graph. Such measure may have a maximum membership value. The transformation cost, in one embodiment, is weighted on predefined critical vertices such as location, learner critical vertices (via a feedback mechanism) and target's preferences (commute window). The maximum membership may be based on historical behavior to prevent coordination failures. The resulting plans may be provided for end user review.

In one embodiment, a pseudo code for the modified BAGA may include:

Choose current block at random from all blocks (Could be based on factors such as total spend)

Choose vertex i within current block

Ranked order all edges within ego net (or community) of vertex i based on edit distance between vertex i's blocks and vertex j's blocks If vertex j's most similar block has membership at or exceeding predefined maximum value chose next vertex from vertex i's ego net If edit distance is above preset minimum edge distance move to next vertex within current block Using historical models, determine probability of accepting or rejecting proposal (this model would also have heuristic cost/reward features such as minimizing travel distance or time between other blocks.

If probability of rejecting is below a predefined minimum value added vertex i to prosed new vertex j's block.

In one aspect, inputs for the modified BAGA may include:

Inputs:

E: Edges

B: Current Block assignments (Bases on historical data)

Blocks are similar to communities but are defined Heuristically or through actual data—e.g. all people attending a yoga class)

N: Neighbors for Current Block based on graph communities

Figure 3C:
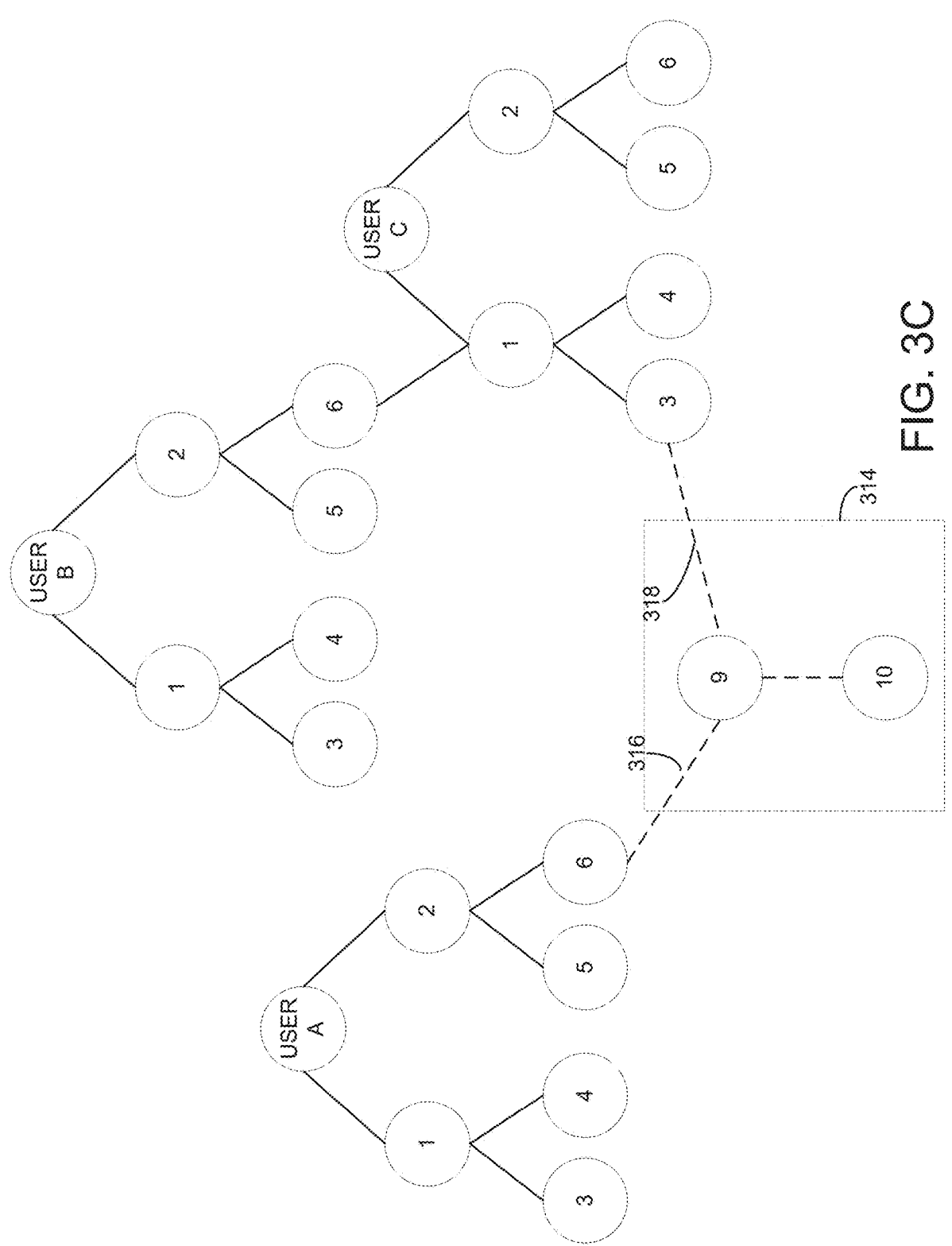

To further illustrate such feature, FIG. 3C illustrates another development of the sub-graph wherein coordination plans may involve a third user, user C. For example, suppose user C is user B's roommate (e.g., sharing the same billing address of a payment device. Again, using the workout activities above, the user C may not have a rigorous workout schedule as user A and user B. However, user C works as a register clerk at a coffee stand/kiosk in the gym. As such, the suggested community 314 between user A and user C may be constructed based on a carpool activity 9 and the costs for both users may be illustrated in edges 316 and 318. The community 314 may further expand to an activity 10 (e.g., user A purchases coffee at the kiosk where user C works) after user A finishes her yoga class.

In another embodiment, the system 100 may further provide a feedback system such that it may include an evolutionary algorithm that may optimize hyper-parameters, such as genetic algorithm or ant colony algorithm. The system 100 may use a grid search if appropriate given the search space. For example, the system 100 perform such additional process run when sufficient data is accumulated to warrant a new run. In such an embodiment, the graph learner engine may input the following data:

metadata:

Weights used in an IPCA run;

Parameters (target sub graph size) for K-Core community detection; and

Parameters (Cut off criteria) for IPCA proposal creation.

In another embodiment, the result from the graph learner engine may include:

% of recipients who adopted plans;

plan results, such as % of users adhering to plan after x-days; and measured improvements in sub-graph behavior In one embodiment, the data may be augmented to infer missed opportunities. For example, missed opportunities may be defined as suspected coordination activity (such as kids drop off in close temporal proximity or users attending a yoga class at the same time) occurs. The system 100 may employ the graph learner algorithm to run against a target sub-population.

In another embodiment, user modified plans may be included as missed opportunities as well. In one aspect, the results may be used to modify the behavior graph or tree used to load parametrization for the community detection and proposal creation processes.

Referring back to FIG. 2C, at 240, the system 100 may simulate impact on the graph structures or the network. The system 100 may detect coordination failures among the suggested sub-graphs at 242. If the determination is yes, the system 100 at 244 may modify behavior graph or tree to avoid similar models. The system 100 may also store such modified behavior to the behavior tree or graph at 246.

If the determination is negative, the system 100 may notify the users (e.g., user 114) of potential coordination in the suggested sub-graph at 248. At 250, the system 100 may also employ graph learner engine or algorithm to search through alternative parameterization that may yield a more optimal result (e.g., as part of the feedback system). At 252, the system 100 may identify additional parameters for the graph learning engine before feeding the identified parameters to query in 212.

In one embodiment, the system 100 may use the following algorithm as part of the community detection:

```
Input: G0(V0, E0) a graph
    1:    k = 0, G = G0
    2:    repeat
    3:        ∀ i ∈ Vk, ai = Assign(i)
    4:        ∀ i, ci = CCi(a) ** connected components (egoNet)
    5:        s = |Vk| ** # of switched nodes
    6:        while s > 0 do Positive Correction:
    7:            while ∃i, Q(i → ci) < 0 do ** negative local gain
    8:                aci = Split(ci)
    9:                ∀ j ∈ ci, cj = CCj (a)
   10:            end while Maximal Correction:
   11:            s = 0
   12:            for all i do
   13:                if Q (i → ci) < Q(i → cj) then ** non maximal local gain
   14:                    ai = Switch (i → cj)
   15:                    s= s + 1
   16:                end if
   17:            end for
   18:            if s > 0 then
   19:                ∀ i, ci = CCi(a)
   20:            end if
   21:        end while
   22:        Ck = {ci}
   23:        Gk+1 = Collapse(Gk, Ck) -> community aggregation
   24:        k = k + 1
   25:    until |Vk| = |Vk-1|
Output: {Ck}
```

Figure 4:
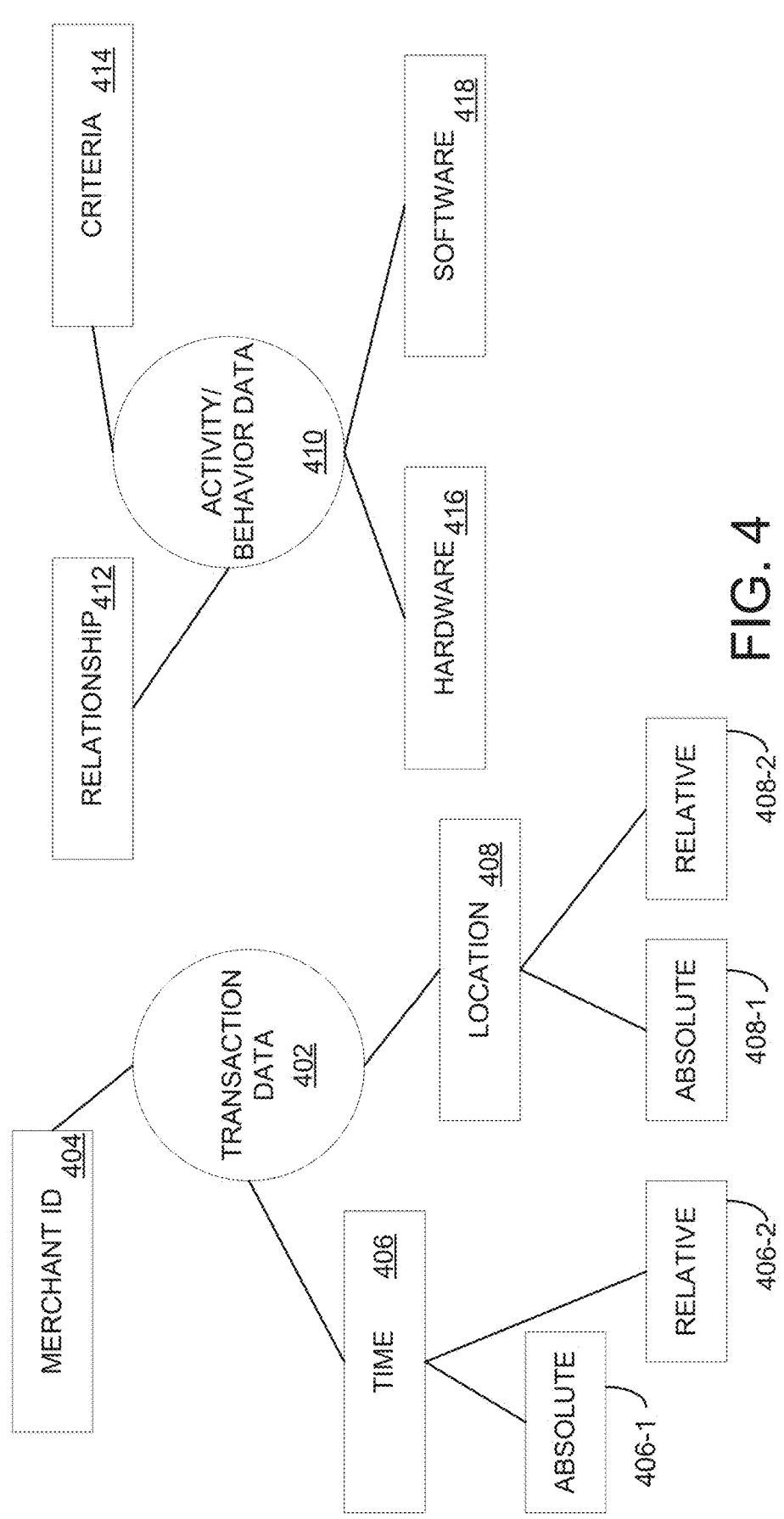
FIG. 4 is a diagram illustrating one or more parameters for a credit request according to one embodiment.

Referring now to FIG. 4, a diagram illustrating a set of parameters for the system 100 to construct sub-graph structures. For example, transaction data 402 may include data such as merchant ID 404, time 406, location 408, etc. As discussed above, the time data 406 and the location data 408 may include their respective absolute values (e.g., 406-1 and 408-1) and relative values (e.g., 406-2 and 408-2).

On the other hand, the activity/behavior data 410 may include relationship data 412, criteria rules or settings 414, hardware data 416 (e.g., device data of the mobile device 118, GPS data, sensors, etc.), and software data 418 (e.g., user interactions and behavior with the app 120).

Referring now to FIG. 5, a flow diagram illustrates a method according to one embodiment. At 502, the system 100 may receive transaction data collected from payment devices of a user, such as the mobile device 118, credit or debit cards. At 504, the system 100 may generate a transaction profile of the user based on the received transaction data. In one embodiment, the generated transaction profile may include at least a geographic location parameter, a time parameter, and an activity parameter. Based on the at least geographic location parameter, the time parameter, and the activity parameter, the system 100 may determine a community of the user at 506.

At 508, the system 100 may receive one or more predefined sub-groups of the community from a database at 508. In one embodiment, the one or more sub-groups define subsets of activities, geographic locations, and times. At 510, the system 100 may identify one or more rules defined by the users, said one or more rules setting limits on the at least geographic location parameter, the time parameter, and the activity parameter. Absent receiving additional user interactions, the system 100 may generate a suggested community for the user as a function of the one or more rules and comparing the activities, geographic locations, and times of the one or more sub-groups of the community at

512. AT 514, the system 100 may generate a suggested activity to the user based on the suggested community.

Figure 7:
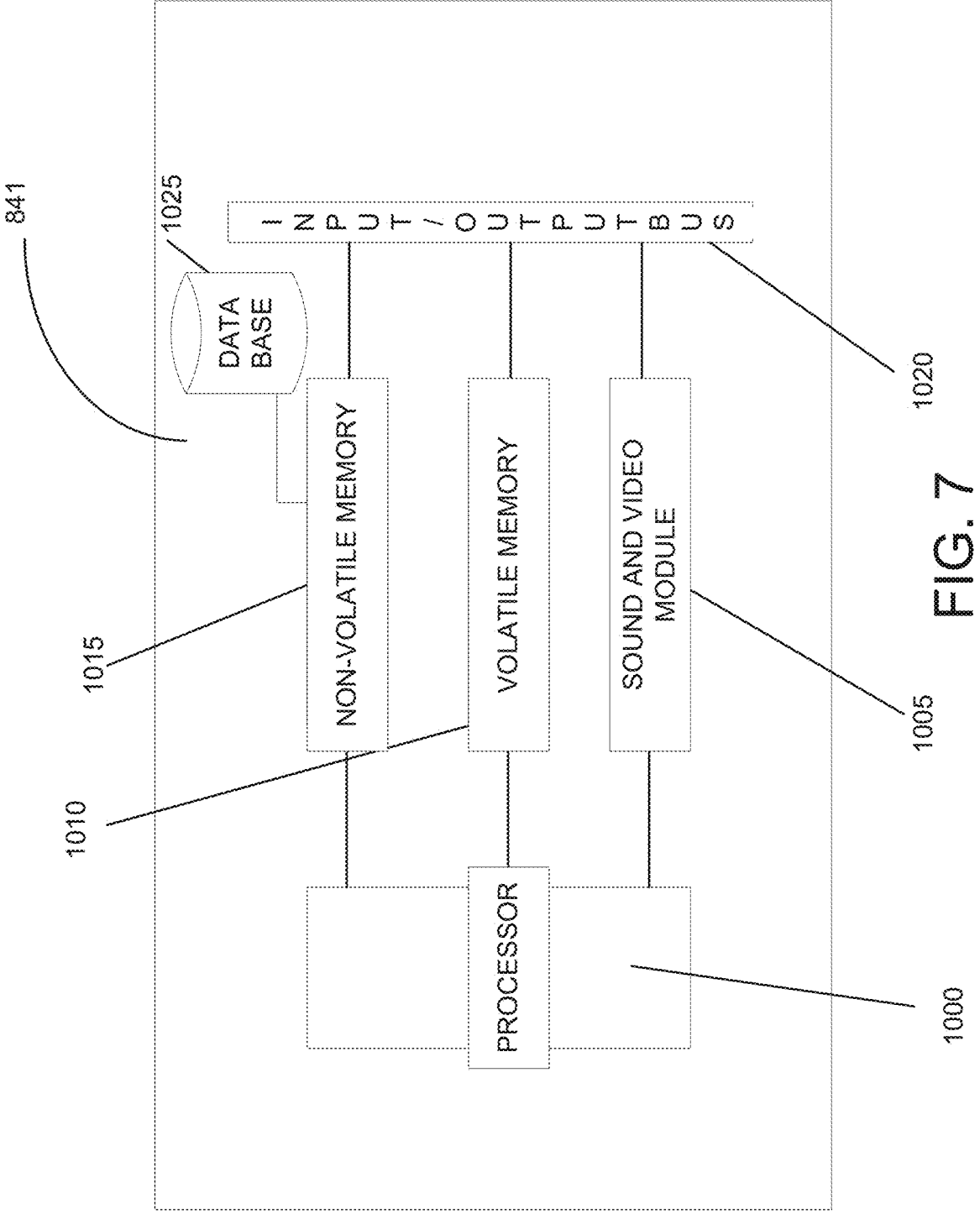
FIG. 7 is a diagram illustrating a computing device according to one embodiment.

FIG. 6 may be a high level illustration of a portable computing device 801 communicating with a remote computing device 841 in FIG. 7 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network 102 such as cellular service, through the Internet, through a private network, through BLUETOOTH, etc., FIG. 6 may be a simplified illustration of the physical elements that make up a portable computing device 801 and FIG. 7 may be a simplified illustration of the physical elements that make up a server type computing device 841.

FIG. 6 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 865 and volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc., It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 7. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc., The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices.

Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges with traditional approaches to suggesting activities or communities for a user. Instead of suggesting activities within the existing structure or scope/community of the user, aspects of embodiments build additional graph structure that expands outside the user's existing community. Moreover, the suggestions or recommendations of aspects of embodiments are more than one-dimensional (e.g., more than whether one relates to another based on a common factor); they are multidimensional in adding a time and space dimensions to any suggestion so that they are more pertinent and have a higher degree of acceptance by the user.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
receiving transaction data collected from a payment device of a first user;
generating a first historic transaction profile of the first user based on the received transaction data, wherein the first historic transaction profile comprises first geographic locations, first times, and first activities;
receiving second historic transaction profiles for second users, wherein each of the second historic transaction profiles comprises second geographic locations, second times, and second activities;
determining a community of the first user based on the first historic transaction profile and second historic transaction profiles, wherein the community comprises the first user and the second users, wherein determining the community comprises constructing a graph structure representing the community, said graph structure comprising at least two vertices and an edge between the at least two vertices, said each of the two vertices representing an activity, and said edge represent a functional measure between activities connected by the edge;
generating a coordination sub-group graph for the community from the graph structure, wherein the coordination sub-group graph comprises the first user and a subset of the second users, and wherein the coordination sub-group graph defines a subset of activities, geographic locations, and times common to the first historic transaction profile and a subset of the second historic transaction profiles; and
generating a coordinated activity recommendation for the first user and at least one of the second users based on the coordination sub-group graph, wherein the coordinated activity recommendation comprises the first user and at least one of the second users coordinating to repeat and perform together at least one of the first activities of the first historic transaction profile and at least one of the second activities of the second historic transaction profiles, wherein the first historic transaction profile and the second historic transaction profiles indicate that the first user and the at least one of the second users previously performed the at least one of the first activities and the at least one of the second activities of the coordinated activity recommendation separately.

2. The computer-implemented method of claim 1, wherein the functional measure comprises a minimum weighted edit distance similarity measure based on times and geographic locations.

3. The computer-implemented method of claim 1, wherein the receiving transaction data comprises data collected from the payment device of the first user, including at least data generated from sensors or components of a computing device of the first user, usage data of the computing device, and usage data of software applications of the computing device.

4. The computer-implemented method of claim 3, wherein generating the first historic transaction profile of the first user comprises generating the first historic transaction profile based on the at least data generated from sensors or components of computing device of the user, the usage data of the computing device, and the usage data of software applications of the computing device.

5. A system comprising:
a payment processing network server comprising a memory and a processor, wherein the memory comprises instructions executable by the processor for:
receiving stored transaction data from one or more payment devices of a first user;
generating a first historic transaction profile of the first user based on the received transaction data, wherein the first historic transaction profile comprises first transactional parameters and first device-based parameters;
receiving second historic transaction profiles for second users, wherein each of the second historic transaction profiles comprises second transactional parameters and second device-based parameters;
determining a community of the first user based on the first historic transaction profile and second historic transaction profiles, wherein the community comprises the first user and the second users, wherein determining the community comprises constructing a graph structure representing the community, said graph structure comprising at least two vertices and an edge between the at least two vertices, said each of the two vertices representing an activity, and said edge represent a functional measure between activities connected by the edge;
generating a coordination sub-group graph for the community from the graph structure, wherein the coordination sub-group graph comprises the first user and a subset of the second users, and wherein the coordination sub-group graph defines a subset transactional parameters and device-based parameters common to the first historic transaction profile and a subset of the second historic transaction profiles;
generating a coordinated activity recommendation for the first user and at least one of the second users based on the coordination sub-group graph, wherein the coordinated activity recommendation comprises the first user and at least one of the second users coordinating to repeat and perform together a first activity corresponding to the first historic transaction profile and a second activity corresponding to the second historic transaction profile, wherein the first historic transaction profile and the second historic transaction profile indicate that the first user and the at least one of the second users previously performed the first activity and second activity separately.

6. The system of claim 5, wherein the transactional parameters common to the first historic transaction profile and the subset of the second historic transaction profiles comprise at least a geographic location parameter, a time parameter, and an activity parameter.

7. The system of claim 5, wherein the device-based parameters common to the first historic transaction profile and the subset of the second historic transaction profiles comprise at least data generated from sensors or components of the one or more payment devices of the first user, usage data of the one or more payment device of the first user, and usage data of software applications of the one or more payment devices of the first user.

8. The system of claim 7, wherein the one or more of the payment devices of the first user comprise a portable computing device.

9. The system of claim 6, wherein the functional measure comprises a minimum weighted edit distance similarity measure based on the time parameters and the geographic location parameters.

10. The system of claim 8, the memory further comprises instructions executable by the processor for collecting data corresponding to the first device-based parameters from the one or more payment devices of the first user.

11. A non-transitory computer-readable medium stored thereon computer-executable instructions for:

receiving stored transaction data from one or more payment devices of a first user;

generating a first historic transaction profile of the first user based on the received transaction data, wherein the first historic transaction profile comprises a first set of parameters corresponding to first activities;

receiving second historic transaction profiles for second users, wherein each of the second historic transaction profiles comprises a second set of parameters corresponding to second activities;

determining a community of the first user based on the first historic transaction profile and second historic transaction profiles, wherein the community comprises the first user and the second users, wherein determining the community comprises constructing a graph structure representing the community, said graph structure comprising at least two vertices and an edge between the at least two vertices, said each of the two vertices representing an activity, and said edge represent a functional measure between activities connected by the edge;

generating a coordination sub-group graph for the community from the graph structure, wherein the coordination sub-group graph comprises the first user and a subset of the second users, and wherein the coordination sub-group graph defines a subset the first set of parameters and the second set of parameters common to the first historic transaction profile and a subset of the second historic transaction profiles;

generating a coordinated activity recommendation for the first user and at least one of the second users based on the coordination sub-group graph, wherein the coordinated activity recommendation comprises the first user and at least one of the second users coordinating to repeat and perform together at least one of the first activities and at least one of the second activities, wherein the first historic transaction profile and the second historic transaction profiles indicate that the first user and the at least one of the second users previously performed the at least one of the first activities and the at least one of the second activities of the coordinated activity recommendation separately, and wherein the at least one of the first activities of the coordinated activity recommendation is different from the at least one of the second activities of the coordinated activity recommendation; and modifying the coordination sub-group graph for the first user based on the first user accepting the coordinated activity recommendation.

12. The non-transitory computer-readable medium of claim 11, wherein the first set of parameters comprise at least a geographic location parameter, a time parameter, and an activity parameter.

13. The non-transitory computer-readable medium of claim 11, wherein the transaction data further comprises a second set of parameters, and wherein the second set of parameters comprise at least data generated from sensors or components of the one or more payment devices of the first user, usage data of the one or more payment devices of the first user, and usage data of software applications of the one or more payment devices of the first user.

14. The non-transitory computer-readable medium of claim 13, wherein the one or more of the payment devices of the first user comprise a portable computing device.

15. The non-transitory computer-readable medium of claim 13, wherein the functional measure comprises a minimum weighted edit distance similarity measure based on times and geographic locations corresponding to the activities.

16. The non-transitory computer-readable medium of claim 13, wherein generating the first historic transaction profile of the first user is further based on the second set of parameters.

* * * * *